(12) United States Patent
Kojima

(10) Patent No.: US 6,178,296 B1
(45) Date of Patent: *Jan. 23, 2001

(54) CAMERA AND CAMERA SYSTEM

(75) Inventor: Teruyuki Kojima, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/166,044

(22) Filed: Oct. 5, 1998

(30) Foreign Application Priority Data

Oct. 9, 1997 (JP) ................................................ 9-277005

(51) Int. Cl.[7] ............................... G03B 15/03; G03B 9/02
(52) U.S. Cl. .......................... 396/157; 396/257; 396/509
(58) Field of Search ................................... 396/257, 157, 396/461, 509

(56) References Cited

U.S. PATENT DOCUMENTS 4,429,971 * 2/1984 Mizokami ............................ 396/157
4,460,263 * 7/1984 Gfeller et al. ........................ 396/157

* cited by examiner

Primary Examiner—W. B. Perkey
(74) Attorney, Agent, or Firm—Robin, Blecker & Daley

(57) ABSTRACT

A camera for use with a flash device capable of performing a test light emitting action and a lens device having a diaphragm includes a lens diaphragm control instructing part for giving an instruction for an aperture controlling action of the diaphragm of the lens device, and a test light emission control part for causing, in response to a predetermined operation (for example, an operation on a stop-down switch provided on the camera), both the aperture controlling action by the lens diaphragm control instructing part and the test light emitting action of the flash device to be performed, so that, in response to the predetermined operation, the test light emission can be performed in a state of having the aperture of the lens diaphragm stopped down. Accordingly, shades and shadows of the object of shooting to be obtained under flash light emission can be simply recognized through the test light emission prior to execution of flash photography without recourse to any complex operation.

10 Claims, 3 Drawing Sheets

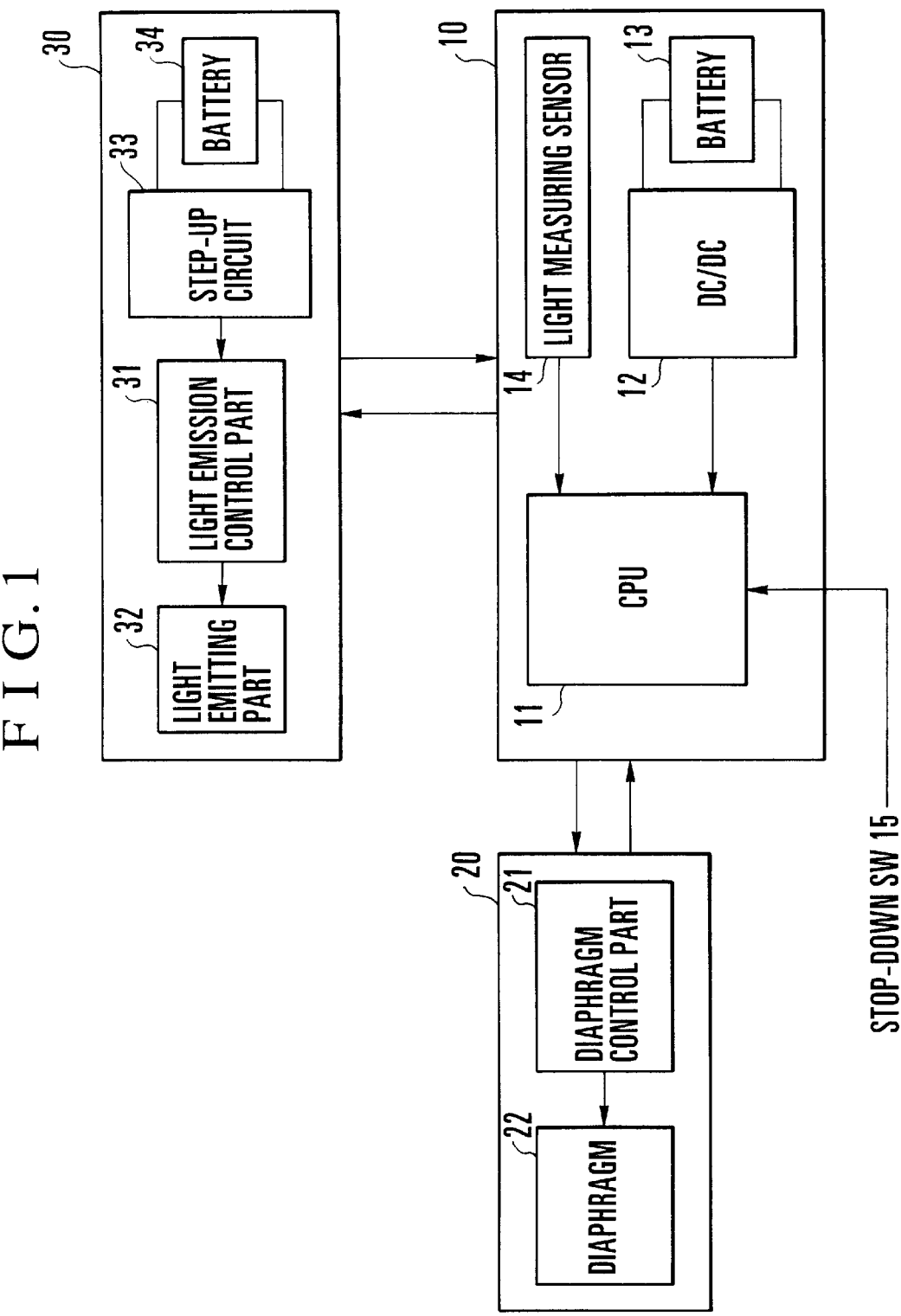
F I G. 1

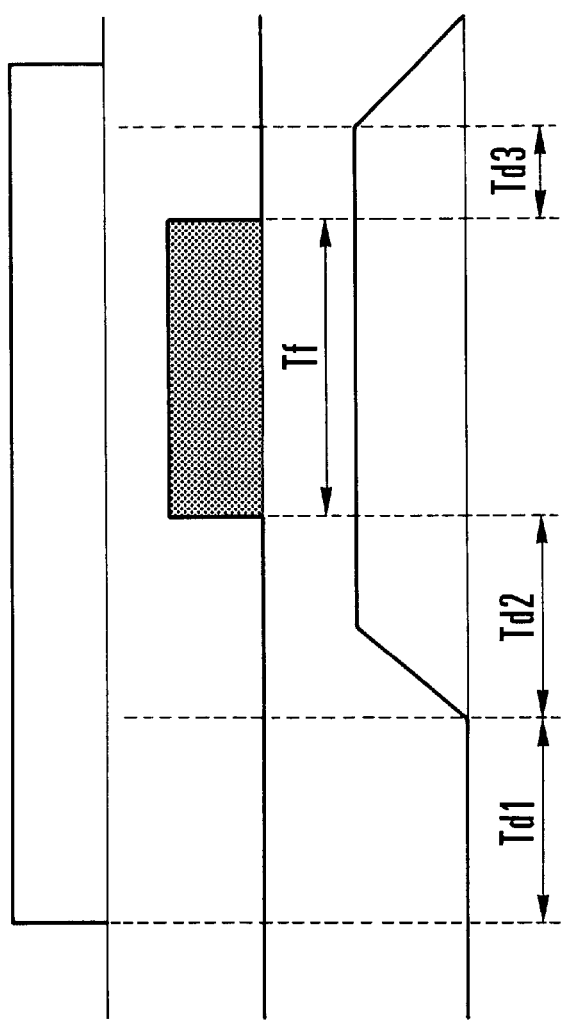
FIG. 2A STOP-DOWN SW ON
FIG. 2B TEST LIGHT EMISSION FROM FLASH DEVICE
FIG. 2C DRIVING OF LENS DIAPHRAGM

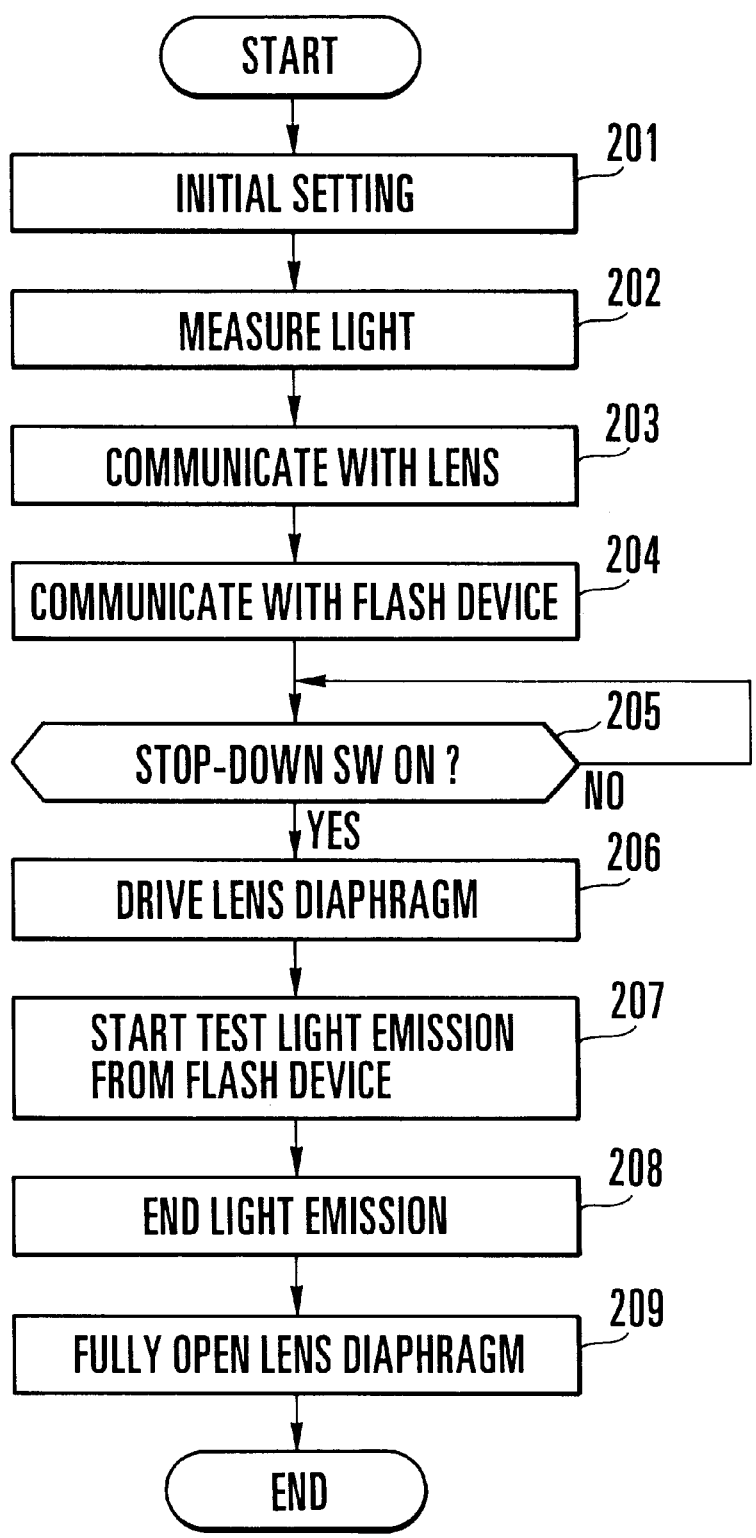

CAMERA AND CAMERA SYSTEM

BACKGROUND OF THE INVENTION

1. Field of the Invention

The present invention relates to a camera and a camera system for use with a flash device.

2. Description of Related Art

Some of known camera systems provided with flash light emitting means are capable of making test light emission from the flash light emitting means, as disclosed, for example, in Japanese Laid-Open Patent Application No. HEI 7-120812, etc. In such camera systems, when a light emission start switch is pushed by the photographer, the flash light emitting means emits a predetermined quantity of flash light for testing toward an object, so that the photographer can recognize shades and shadows brought about at the object and the background thereof by the flash light. Thus, the photographer can recognize, prior to photo-taking, an influence to be brought about by the illumination with the flash light.

In the case of the camera system disclosed in the above Japanese laid-open patent application No. HEI 7-120812, however, the test flash light emission is made with a lens diaphragm left in its initial full-aperture state. Therefore, in recognizing the object, etc., through a viewfinder after a light flux passing through the lens diaphragm arrives at the viewfinder, the shades and shadows of the object, etc., observable through the viewfinder at the time of the test flash light emission are only ones which are obtained with the lens diaphragm left in its full-aperture state and which differ from shades and shadows to be obtained by exposing a film to the light coming through the photo-taking lens with the lens diaphragm in a stopped-down state. Accordingly, the prior camera system has such a drawback that the photographer cannot recognize, prior to photo-taking, the shades and shadows of the object and the background to be obtained under flash light emission for a photo-taking operation which is to be performed with the lens diaphragm stopped down as desired to deepen the depth of field.

BRIEF SUMMARY OF THE INVENTION

It is an object of the invention to provide a camera system capable of making test flash light emission before photo-taking under the same condition of a diaphragm as in emitting flash light at the time of photo-taking.

In accordance with one aspect of the invention, there is provided a camera for use with a flash device capable of performing a test light emitting action and a lens device having a diaphragm, the camera comprising lens diaphragm control instructing means for giving an instruction for an aperture controlling action of the diaphragm of the lens device, and test light emission control means for causing, in response to a predetermined operation, both the aperture controlling action by the lens diaphragm control instructing means and the test light emitting action of the flash device to be performed, so that, in response to the predetermined operation, the test light emission can be performed in a state of having the aperture of the lens diaphragm stopped down.

In accordance with another aspect of the invention, there is provided a camera system for use with a flash device capable of performing a test light emitting action, the camera system comprising a diaphragm, aperture setting control means for controlling an aperture setting action of the diaphragm, a predetermined operation part, and test light emission control means for causing, in response to an operation of the predetermined operation part, both the aperture setting action by the aperture setting control means and the test light emitting action of the flash device to be performed, so that, in response to the operation of the predetermined operation part, the test light emission can be performed in a state of having the aperture of the lens diaphragm stopped down.

The above and other objects and aspects of the invention will become apparent from the following detailed description of a preferred embodiment thereof taken in connection with the accompanying drawings.

BRIEF DESCRIPTION OF THE SEVERAL VIEWS OF THE DRAWING

FIG. 1 is a block diagram showing the arrangement of a camera system according to an embodiment of the invention.

FIGS. 2A, 2B and 2C are timing charts for explaining the actions of the camera system shown in FIG. 1.

FIG. 3 is a flow chart showing a test light emitting action of the camera system shown in FIG. 1.

DETAILED DESCRIPTION OF THE INVENTION

Hereinafter, a preferred embodiment of the invention will be described in detail with reference to the drawings.

FIG. 1 is a block diagram showing the arrangement of a camera system according to the embodiment of the invention. In FIG. 1, reference numeral 10 denotes a camera. The camera 10 contains a CPU (control means) 11 which is arranged to preside control over the camera 10, and a battery 13 for the camera 10. A DC/DC converter 12 is connected to the battery 13 and is arranged to supply electric power to the camera 10 and the CPU 11. A light measuring sensor 14 is connected to the CPU 11 and is arranged to measure the luminance of a photo-taking field of the camera 10. Reference numeral 15 denotes a stop-down switch provided on the camera 10.

A lens 20 is connected to the camera 10. The lens 20 contains a diaphragm 22 and a diaphragm control part (lens diaphragm aperture setting means) 21 which is arranged to control the diaphragm 22.

A flash device (flash light emission means) 30 is connected to the camera 10. The flash device 30 contains a light emission control part 31 which is arranged to control the light emission of the flash device 30. A light emitting part 32 is connected to the light emission control part 31. Reference numeral 34 denotes a battery provided for the flash device 30. A step-up circuit 33, which is connected to the battery 34, is arranged to generate a high voltage for flash light emission and to supply the high voltage to the light emitting part 32.

A test light emitting action of the camera system configured as described above is next described with reference to a flow chart of FIG. 3 and timing charts of FIGS. 2A, 2B and 2C. At a step 201 of FIG. 3, the CPU 11 performs an initial setting action on the camera 10, including setting a photo-taking mode, an ISO film sensitivity value, etc., which are necessary for control over the camera 10. At the next step 202, a measured light value is obtained by driving the light measuring sensor 14 to measure the luminance of a photo-taking field.

At a step 203, the CPU 11 communicates with the diaphragm control part 21 of the lens 20 to obtain information on intrinsic matters of the lens 20, such as the full-aperture F-number and the focal length of the lens 20. At a step 204, the CPU 11 communicates with the light emission control part 31 of the flash device 30 to obtain information on intrinsic matters of the flash device 30, such as a zoom-position setting state of the flash device 30 and the charged state of a main capacitor (not shown). Further, according to the measured light value obtained at the step 202, the CPU 11 decides a photo-taking mode, a shutter speed Tv and a lens aperture value Av suited for the information obtained from the lens 20 and the flash device 30.

At a step 205, the CPU 11 checks the stop-down switch 15 for its state. If the stop-down switch 15 is found to be in operation, the flow of operation proceeds to a step 206. At the step 206, the CPU 11 instructs the diaphragm control part 21 of the lens 20 to control the diaphragm 22 after the lapse of a period of time Td1 from the start of operation of the stop-down switch 15, as shown in FIGS. 2A and 2C. The diaphragm control part 21 begins to drive the diaphragm 22 to obtain an amount of aperture which is the same as the lens aperture value Av decided at the step 204 and to be used at the time of photo-taking. As shown in FIG. 2C, the diaphragm 22 reaches the aperture amount decided and then becomes stable after the lapse of a predetermined period of time Td2 from the start of the driving action of the diaphragm control part 21 on the diaphragm 22.

At a step 207, after the lapse of the period of time Td2, as shown in FIG. 2B, the CPU 11 sends an instruction to the light emission control part 31 of the flash device 30 for the commencement of test light emission. The step-up circuit 33 of the flash device 30 is controlling a high voltage to let the main capacitor (not shown) have a predetermined voltage. The light emission control part 31 distributes the energy stored in the main capacitor and causes the light emitting part 32 to make the test light emission by controlling the quantity of light of the light emitting part 32 in such a way as to have the test light emission made at a predetermined quantity of light defined by the amount and time of light emission.

At a step 208, the CPU 11 sends an instruction for bringing the test light emission to a stop to the light emission control part 31 after the lapse of a period of time Tf from the start of the test light emission. The flash device 30 then stops making the test light emission.

At a step 209, the CPU 11 sends an instruction to the diaphragm control part 21 of the lens 20 for control over the diaphragm 22 after the lapse of a period of time Td3 from the stop of the test light emission. In response to the instruction, the diaphragm control part 21 drives the diaphragm 22 to fully open its aperture. A series of actions for the test light emission comes to an end when the diaphragm 22 reaches its full aperture position.

Further, the camera 10 is provided with a mode setting operation part (not shown) which is arranged to permit setting a test light emission mode in which both the test light emission and the diaphragm aperture setting are performed and an ordinary stop-down mode in which the diaphragm aperture setting is performed without performing the test light emission. When the stop-down switch 15 is operated while the camera 10 is set in the test light emission mode, both the test light emission and the diaphragm aperture setting are performed in accordance with the procedures set forth in the flow chart of FIG. 3. When the stop-down switch 15 is operated while the camera 10 is set in the ordinary stop-down mode, the diaphragm aperture setting is performed without performing the test light emission.

According to the arrangement of the embodiment, as described above, the test light emission can be made from the flash device 30 with the lens diaphragm 22 set in an aperture position which is the same as an aperture value Av decided to be used for photo-taking. The arrangement thus enables the photographer to recognize, prior to photo-taking, the shades and shadows to be brought about at the object and the background under the flash light at the time of an actual photo-taking operation, which is to be performed with the diaphragm aperture stopped down to deepen the depth of field. Therefore, flash photography can be adequately carried out according to information obtained through the test light emission.

Further, since the embodiment is arranged to make the test light emission of the flash device 30 in response to an operation on the stop-down switch 15, the photographer who wishes to recognize beforehand the shades and shadows of the object, etc., to be obtained under light emission from the flash device, with the lens aperture stopped down, is required only to turn on the stop-down switch 15 before the actual photo-taking operation without any complex operation.

In the case of the embodiment, the stop-down switch 15 is mounted on the camera 10. The stop-down switch 15 or a like operation part, however, may be mounted on the lens 20 or the flash device 30.

In the case of the embodiment, the camera 10, the lens 20 and the flash device 30 are respectively arranged to be independent of each other in structure. However, the invention is applicable also to a case where they are arranged integrally with each other.

Further, in the case of the embodiment, the test light emission is made with flash light from the flash device. However, the invention is applicable also to a case where the test light emission is made in the form of pulse light emission or flat light emission.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well known in the camera arts and their specific construction and operation are not critical to the operation or best mode for carrying out the invention.

The invention may be carried out by combining as necessary the embodiment or its technolocical elements described in the foregoing.

The invention applies to cases where either the whole or a part of claims or the arrangement of the embodiment described forms one apparatus or is used in combination with some other apparatus or as a component element of an apparatus.

What is claimed is:

1. A camera for use with a flash device capable of performing a test light emitting action and a lens device having a diaphragm, said camera comprising:

a light measuring sensor which measures brightness of an object and outputs a light measurement signal;

lens diaphragm control means for an aperture controlling action of the diaphragm of the lens device on the basis of the light measurement signal from the light measuring sensor;

test light emission control means for causing, in response to a predetermined operation, both the aperture controlling action by said lens diaphragm control means and the test light emitting action of the flash device to be performed, after the test light emission control means performs the aperture controlling action, the test light emission control means performs the test light emitting action; and the camera selecting a first mode to perform both the test light emitting action of the flash device and the aperture controlling action by said lens diaphragm control means according to the predetermined operation and a second mode to perform the aperture controlling action by said lens diaphragm control means without the test light emitting action of the flash device according to the same predetermined operation.

2. A camera according to claim 1, wherein said test light emission control means includes means for causing the aperture controlling action of the diaphragm of the lens device to start first and, causing the test light emitting action of the flash device to start subsequently.

3. A camera according to claim 2, wherein said test light emission control means includes means for causing the test light emitting action to start after a predetermined period of time has elapsed from the start of the aperture controlling action of the diaphragm.

4. A camera according to claim 3, wherein said test light emission control means includes time counting means for counting time as to whether the predetermined period of time has elapsed from the start of the aperture controlling action of the diaphragm, and means for causing the test light emitting action to start in accordance with the time counted by said time counting means.

5. A camera according to claim 1, wherein said test light emission control means includes means for canceling, after completion of the test light emitting action, the aperture controlling action of the diaphragm by said lens diaphragm control means.

6. A camera according to claim 5, wherein said test light emission control means includes means for canceling, after a predetermined period of time has elapsed from the completion of the test light emitting action, the aperture controlling action of the diaphragm by said lens diaphragm control means.

7. A camera according to claim 1, wherein the lens device is an interchangeable lens device which is detachably mountable on said camera, and said lens diaphragm control means includes signal transmission means for transmitting a diaphragm control instruction signal from said camera to said interchangeable lens device.

8. A camera according to claim 7, wherein said test light emission control means includes means for causing, in response to the predetermined operation, said lens diaphragm control means to transmit the diaphragm control instruction signal from said camera to said interchangeable lens device and, subsequently, transmitting an instruction signal for causing the flash device to perform the test light emitting action.

9. A camera according to claim 1, wherein said test light emission control means includes means for starting control for the test light emitting action in response to an operation performed on a stop-down operation part provided on said camera.

10. A camera system for use with a flash device capable of performing a test light emitting action, said camera system comprising:

a diaphragm;

a light measuring sensor which measures brightness of an object and outputs a light measurement signal;

aperture setting control means for controlling an aperture setting action of said diaphragm on the basis of the light measurement signal from the light measuring sensor;

a predetermined operation part;

test light emission control means for causing, in response to a predetermined operation of said predetermined operation part, both the aperture setting action by said aperture setting control means and the test light emitting action of the flash device to be performed, after the test light emission control means performs the aperture setting action, the test light emission control means performs the test light emitting action; and the camera selecting a first mode to perform both the test light emitting action of the flash device and the aperture setting action by said aperture setting control means according to the predetermined operation and a second mode to perform the aperture setting action by said aperture setting control means without the test light emitting action of the flash device according to the same predetermined operation.

* * * * *